(12) United States Patent
Kennedy (10) Patent No.: US 7,600,732 B2
(45) Date of Patent: Oct. 13, 2009

(54) AIRCRAFT INTERIOR EQUIPMENT SUPPORT

(75) Inventor: Othar P. Kennedy, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 359 days.

(21) Appl. No.: 11/761,854

(22) Filed: Jun. 12, 2007

(65) Prior Publication Data
US 2008/0035828 A1 Feb. 14, 2008

Related U.S. Application Data

(60) Provisional application No. 60/837,671, filed on Aug. 14, 2006.

(51) Int. Cl.
*F16M 13/00* (2006.01)
(52) U.S. Cl. .................. 248/416; 248/425; 296/65.07; 297/344.1
(58) Field of Classification Search .............. 248/415, 248/416, 418, 425, 130, 144; 296/65.07; 297/344.1, 344.22, 344.24
See application file for complete search history.

(56) References Cited

U.S. PATENT DOCUMENTS

| 4,671,572 | A | 6/1987 | Young et al. |
| 5,853,221 | A | 12/1998 | Thoman et al. |
| 6,938,957 | B2 | 9/2005 | Beatty et al. |
| 7,399,035 | B2 * | 7/2008 | Kusanagi et al. ....... 297/344.24 |
| 7,520,567 | B2 * | 4/2009 | Billger et al. .......... 297/344.22 |
| 2003/0057755 | A1 | 3/2003 | Brandt et al. |
| 2003/0189370 | A1 | 10/2003 | Hemmer et al. |
| 2007/0222267 | A1 * | 9/2007 | Tsujimoto et al. ...... 297/344.24 |
| 2007/0246987 | A1 * | 10/2007 | Sano et al. ............. 297/344.24 |

FOREIGN PATENT DOCUMENTS

WO 93/18318 A1 9/1993

* cited by examiner

*Primary Examiner*—Ramon O Ramirez
(74) *Attorney, Agent, or Firm*—Jerry J. Holden; John D. Titus (57) ABSTRACT

A equipment support for aircraft and the like comprises a base to which a lower link, an intermediate link, and a equipment platform are attached. The lower link rotates horizontally about the base. The intermediate link rotates horizontally about the end of the lower link and the equipment platform rotates horizontally about the end of the intermediate link. This arrangement gives the equipment platform the ability to assume an infinite number of lateral positions and 360 degrees of rotation. The equipment support is locked in position by means of locking pins that engage corresponding metering plates adjacent the support bearings. The locking pins are released by a common linkage that sequentially releases the equipment platform rotation lock then simultaneously releases the rotation locks of the intermediate and lower links.

20 Claims, 8 Drawing Sheets

AIRCRAFT INTERIOR EQUIPMENT SUPPORT

CROSS-REFERENCE TO RELATED APPLICATION

The application claims priority of provisional application No. 60/837,671 filed Aug. 14, 2006.

BACKGROUND OF THE INVENTION

The present invention relates to adjustable supports for aircraft interior equipment, in particular supports for aircraft seating, tables and the like.

A need exists in many aircraft interiors for seats and tables to translate and/or rotate for passenger comfort. Many aircraft floor space plans require several degrees of motion to allow a bulky seat or coffee table to be moved in the tight confines of smaller business aircraft. Seats must often be movable toward or away from tables, desks and other seats, all without using up valuable floor space. Military aircraft often have a need to access multiple stations from a single seat. In each of these cases, however, a chosen locked position must securely support and protect the seat occupant for normal use, turbulence loads and hard landing loads.

U.S. Pat. No. 4,671,572 (hereinafter "the '572 patent") discloses an adjustable chair having a chair post that is movable within a large aperture in the mounting frame. This arrangement allows the chair to be rotated and translated across the top of the chair mounting frame. The chair is fixed in a desired position by a friction brake that engages the underside of the chair mounting frame. A disadvantage of the chair disclosed in the '572 patent is the substantial volume and floor space occupied by the relatively bulky chair mounting frame. Additionally, the friction lock does not provide a positive locking feature to endure heavy side loads.

SUMMARY OF THE INVENTION

The present invention comprises a support for securing interior equipment such as seats and tables to a frame such as for securing an aircraft seat to the floor of an aircraft. According to an illustrative embodiment, the support comprises a base that is attached to the aircraft floor. The base supports a lower support thrust bearing. A lower link is attached at one end to the support bearing so that the link is capable of rotating about the base. The other end of the link has a bearing that supports a second, intermediate link so that the intermediate link rotates about the end of the lower link. The opposite end of the intermediate link has a bearing that supports the seat platform, which enables the seat platform to rotate about the end of the intermediate link. This arrangement of links allows the seat frame to be moved laterally in any direction and the seat frame to be rotated 360 degrees.

In the illustrative embodiment, the support is locked in position by means of locking pins that engage corresponding metering plates adjacent the support bearings. The locking pins are released by a common linkage that sequentially releases the seat rotation lock then simultaneously releases the rotation locks of the intermediate and lower links. The simultaneous release of the intermediate and lower locks is effected by a movable yoke that is attached to the intermediate link. Although the yoke is attached to the intermediate link, the mechanism does not bind the lower and intermediate links or the seat platform from rotating in the released position because each locking pin engages its corresponding metering plate at a contact point located substantially on the same axis as the support bearing immediately above. Thus the lower link rotation lock engages its metering plate substantially along the rotational axis defined by the bearing that supports the intermediate link and the intermediate link rotation lock engages its metering plate substantially along the rotational axis of the bearing that supports the seat platform. The locking and release mechanism thus permits full translation and rotation of the seat platform while providing for a solid, positive lock of the seat platform once the locks are engaged.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

The drawing figures are intended to illustrate to the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the figures and in particular FIGS. 1-5, seat support 10 comprises a base 12 a lower link 14 an intermediate link 16 and a seat platform 18. Lower link 14 is supported at its fixed end 20 by a lower thrust collar assembly 22 consisting of a spigot flange 24 and a roller thrust bearing 26. The flanged portion 28 of spigot flange 24 has a plurality of holes 30 formed therein to form a metering plate 32, the function of which will be explained in greater detailed hereafter. A retainer assembly 34 consisting of a second roller thrust bearing 36 and a collar 38 retains lower link 14 to the spigot portion 40 of spigot flange 24.

The free end 44 of lower link 14 supports the fixed end 42 of intermediate link 16 by means of an intermediate thrust collar assembly 46 attached to free end 44 of lower link 14. Intermediate thrust collar assembly 46 includes a metering plate 32a with a plurality of holes 30a and is identical in construction to thrust collar assembly 22 and therefore will not be explained further herein. Intermediate link 16 is retained on intermediate thrust collar assembly 46 by a retainer assembly 48, which is identical in construction and operation to retainer assembly 34 and therefore will not be explained in detail herein.

Seat platform 18 is secured to the free end 50 of intermediate link 16 by an upper thrust collar assembly 52, which is attached to the free end 50 of intermediate link 16. Upper thrust collar assembly 52 includes a metering plate 32b having a plurality of holes 30b and is identical in construction and operation as thrust collar assembly 22 and therefore will not be explained further herein. Seat platform 18 is retained to thrust collar assembly 52 by a retainer assembly 54, which is identical in construction and operation to retainer assembly 34.

Figure 1:
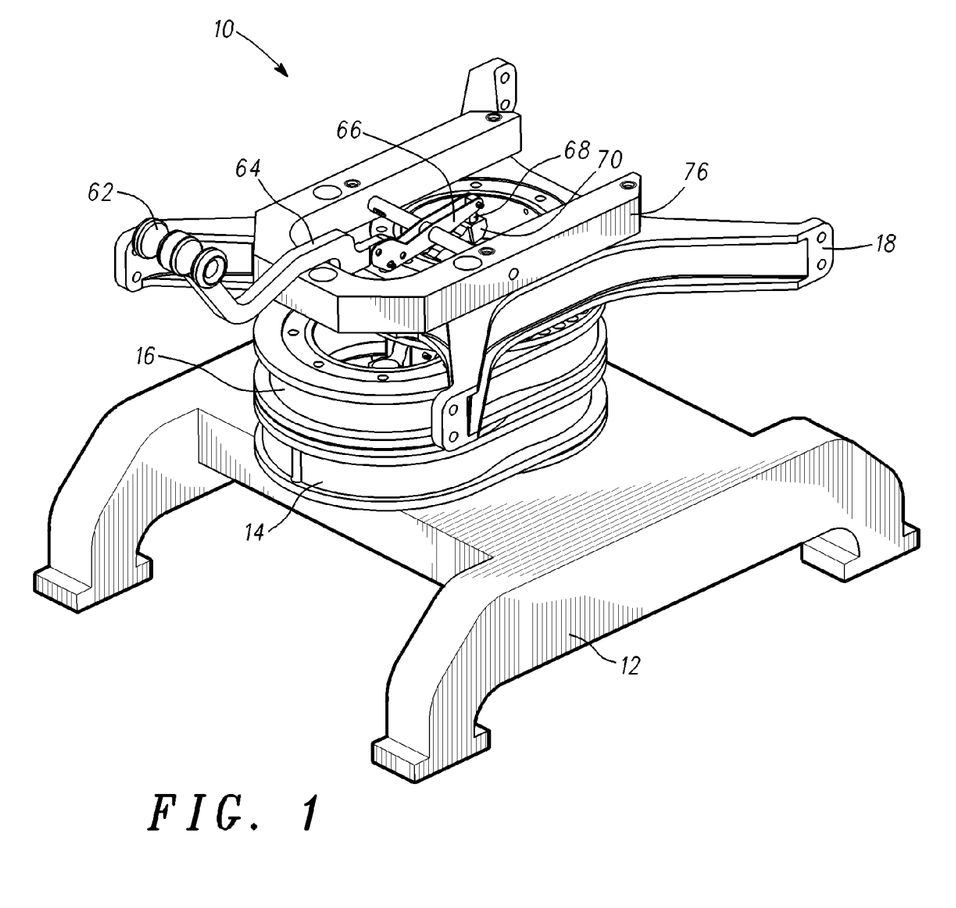
FIG. 1 is a front perspective view of an illustrative embodiment of a seat platform incorporating features of the present invention.
Figure 2:
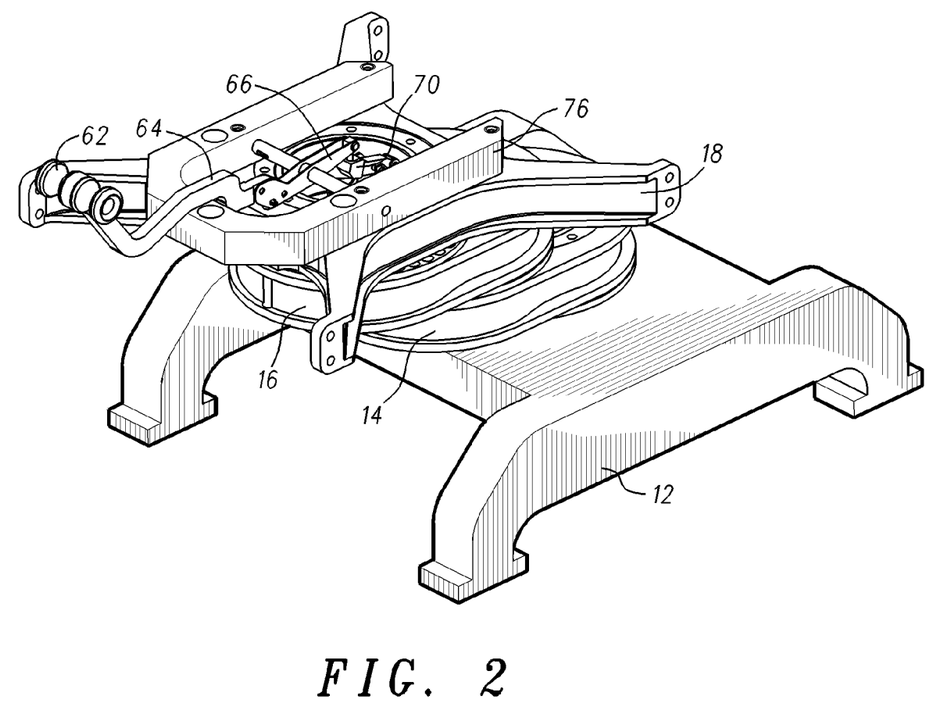
FIG. 2 is a front perspective view of the illustrative seat platform in its forwardmost extended position.
Figure 3:
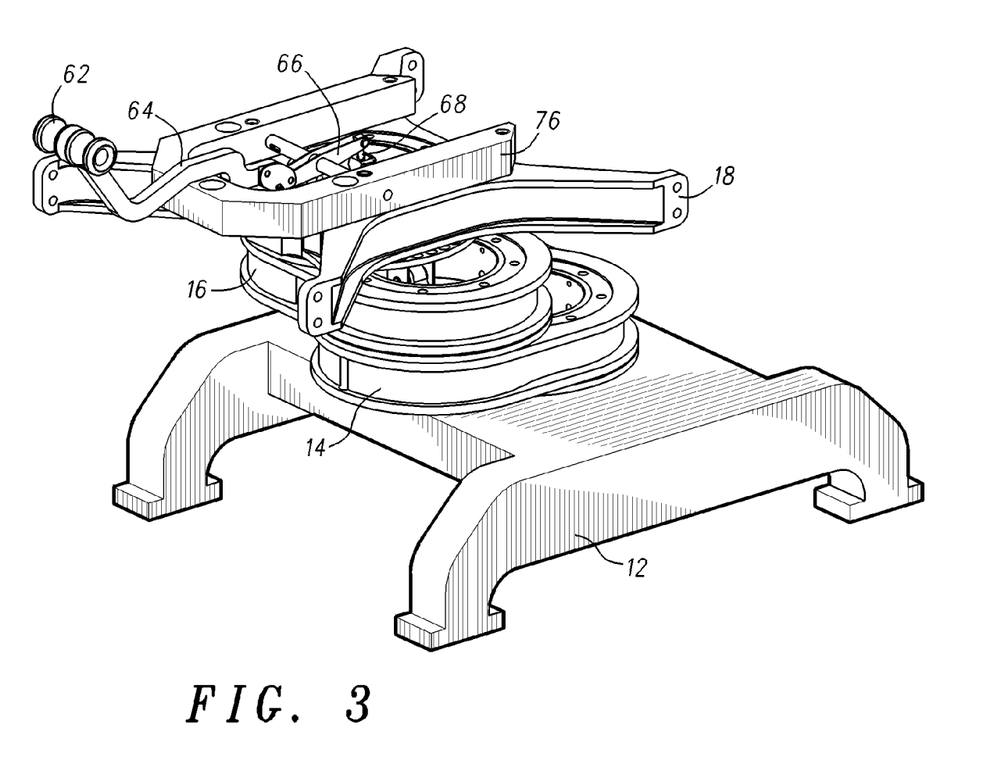
FIG. 3 is a front perspective view of the illustrative seat platform in a partially extended position.
Figure 4:
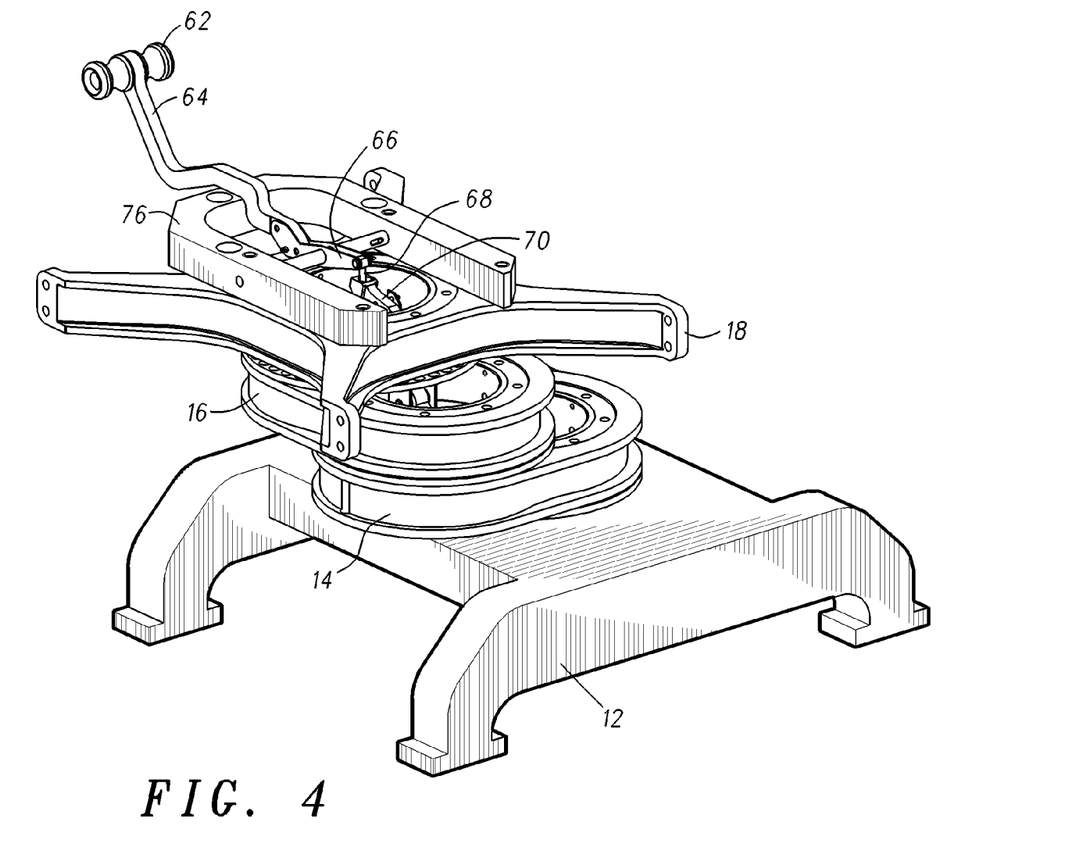
FIG. 4 is a front perspective view of the illustrative seat platform in a partially extended and rotated position.
Figure 5:
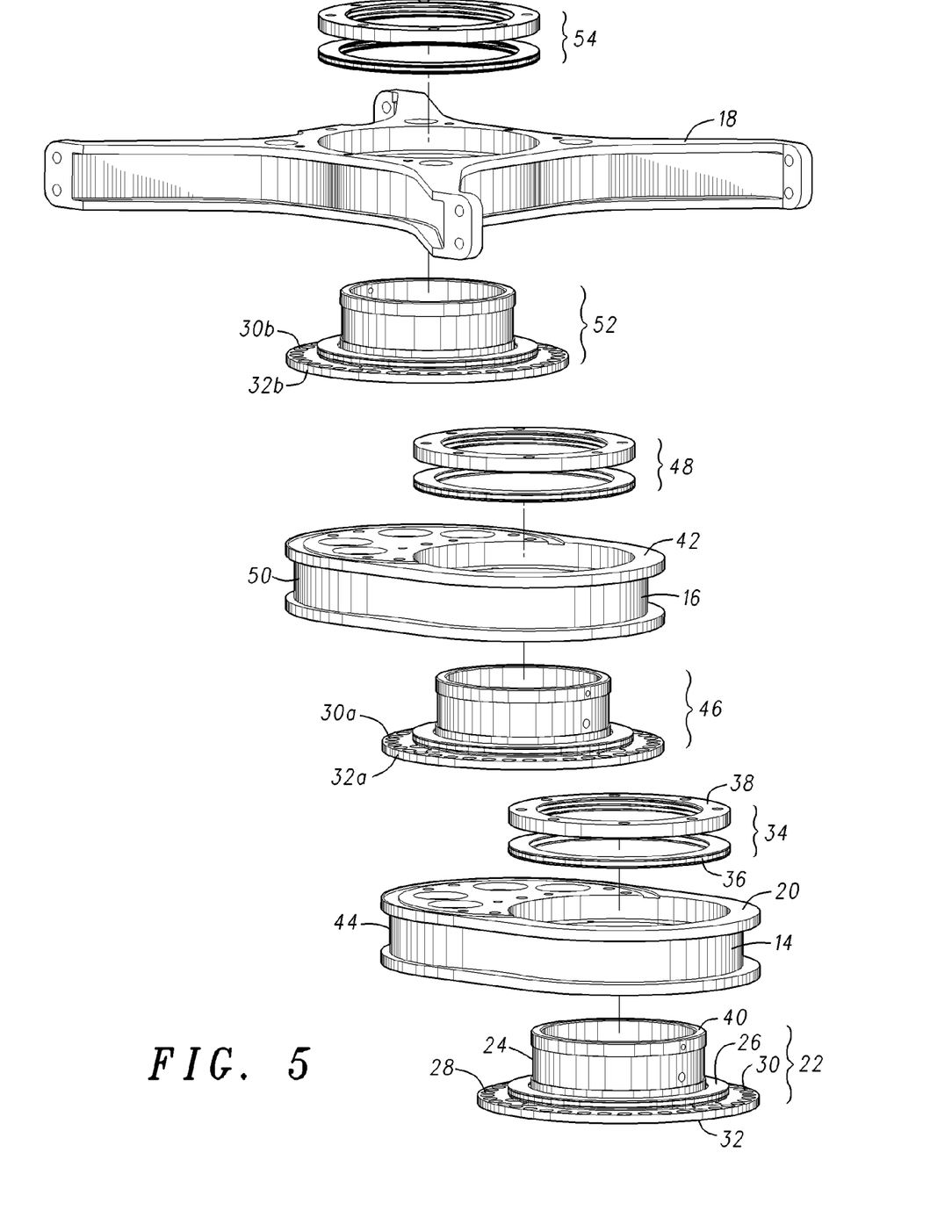
FIG. 5 is an exploded perspective view of portions of the links and seat platform of the illustrative seat support.
Figure 6:
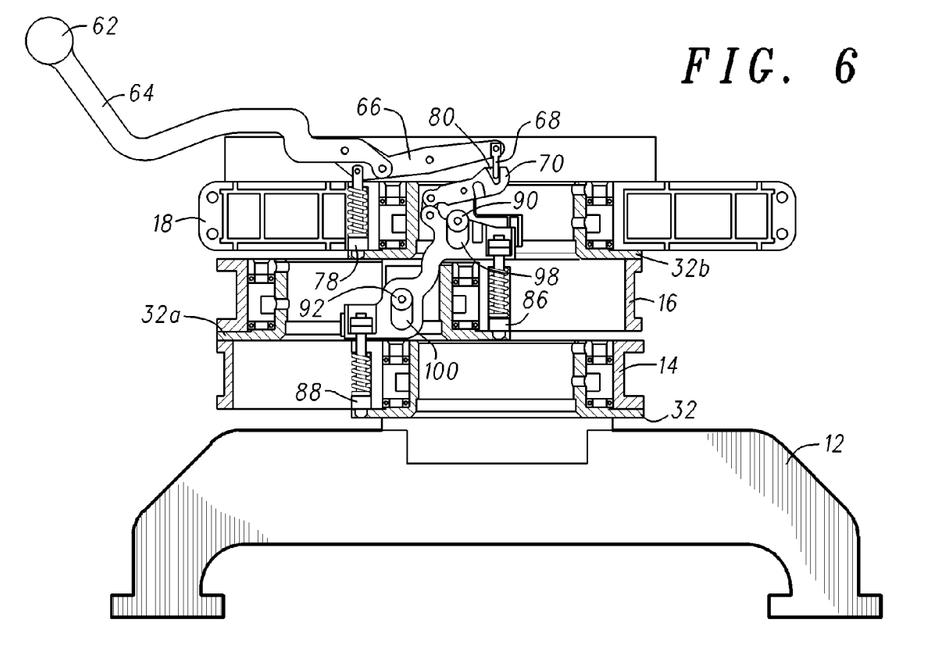
FIG. 6 is a cross-sectional view of the illustrative seat support with the rotation locks in their fully engaged position.
Figure 7:
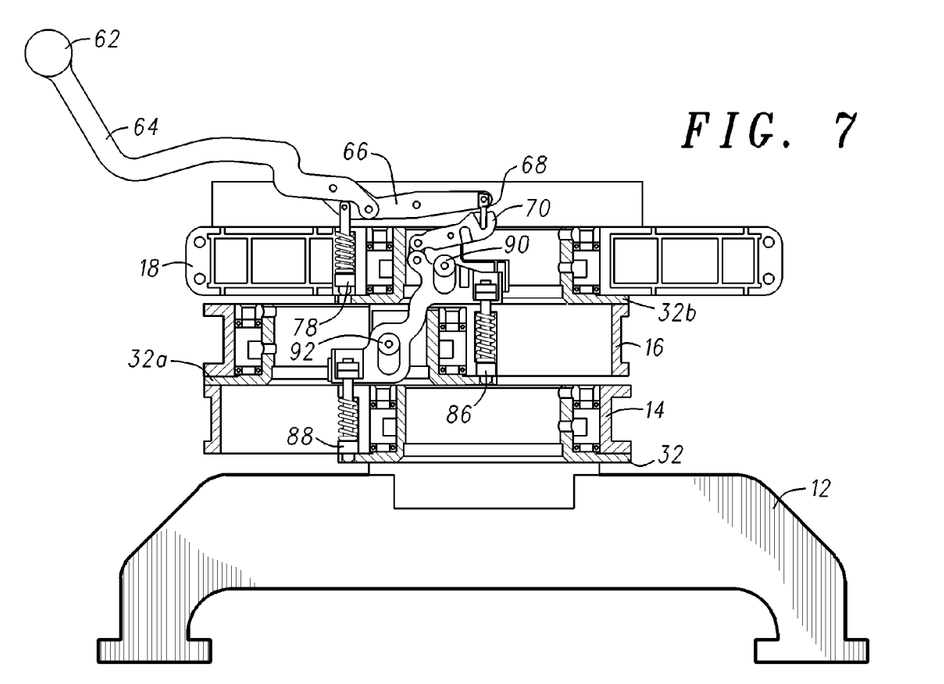
FIG. 7 is a cross-sectional view of the illustrative seat support with the seat rotation lock disengaged.

As can be determined from the foregoing, the arrangement of bearings and links enable seat platform 18 to be located anywhere from directly over the centerline of the rotating joint defined by thrust collar assembly 22 as shown in FIG. 1 to a fully forward extended position as shown in FIG. 2, to a partially forward position as shown in FIG. 3, to a partially forward and rotated position as shown in FIG. 4, or any number of intermediate, rotated and unrotated positions enabled by the two degrees of freedom inherent in the arrangement of links and rotating joints.

With further reference to FIGS. 6-9, lower link 14, intermediate link 16 and seat platform 18 are locked in position by seat locking pin 78, intermediate locking pin 86 and lower locking pin 88, each of which is spring-loaded to engage a corresponding hole 30, 30a, 30b in metering plates 32, 32a, 32b. Lower link 14, intermediate link 16 and seat platform 18 are released for rotation/translation then locked into position by means of a locking and release mechanism 60 which consists of a handle 62, an arm 64 an upper walking beam 66, a push rod 68, a lower walking beam 70 and a yoke 72. Upper walking beam 66 is supported by upper axle 74 which rotates in corresponding recesses formed in control lever mount 76 (FIGS. 1-4). As handle 62 is pulled upward, upper walking beam 66 simultaneously lifts seat locking pin 78 against its spring so that it disengages corresponding hole 30b of metering plate 32b. Simultaneously, upper walking beam 66 presses push rod 68 into socket 80 of lower walking beam 70. As can be seen most clearly in FIGS. 6-7, there is positive engagement between upper walking beam 66 and seat locking pin 78 so that lifting handle 62 causes seat locking pin 78 to immediately disengage metering plate 32b to allow the seat to rotate. However, there is clearance between push rod 68 and the bottom of socket 80 of lower walking beam 70. Therefore, lower walking beam 70 does not move immediately. As handle 62 is pulled further upward, however, push rod 68 engages the lower surface of socket 80 causing lower walking beam 70 to pivot about its lower axle 82, which in turn lifts yoke 72 via link 84.

Yoke 72 is constrained to move vertically under the urging of link 84 by means of rollers 90, 92 mounted to saddles 94, 96 each of which engage a corresponding track 98 and 100 formed in yoke 72. As yoke 72 is lifted upward, it simultaneously lifts intermediate locking pin 86 and lower locking pin 88 to disengage pins 86 and 88 from corresponding holes 30 and 30a of metering plates 32 and 32a. With locking pins 86 sand 88 released, lower link 14 and intermediate link 16 are free to rotate about their respective thrust collar assemblies 22 and 46, thereby enabling horizontal translation of seat platform 18.

As noted hereinbefore, yoke 72 lifts intermediate locking pin 86 and lower locking pin 88 simultaneously so that each disengages its respective metering plate at the same time, however, in an alternative embodiment, yoke 72 disengages intermediate locking pin 86 and lower locking pin 88 sequentially. As can be seen most clearly in FIG. 8, lower locking pin 88 engages metering plate 32 at a point that is located substantially on the axis of rotation 102 that is defined by intermediate thrust collar assembly 46. Thus even with lower locking pin 88 engaged to metering plate 32, intermediate link 16 can still rotate about intermediate thrust collar assembly 46 as long as intermediate locking pin 86 is disengaged. Intermediate link 16 simply pivots about lower locking pin 88 in its engaged position. Similarly, intermediate locking pin 86 engages metering plate 32a at a point that lies substantially on the axis of rotation 104 defined by upper thrust collar assembly 52. This enables seat platform 18 to rotate about upper thrust collar assembly 52 as long as seat locking pin 78 is disengaged from metering plate 32b.

Figure 8:
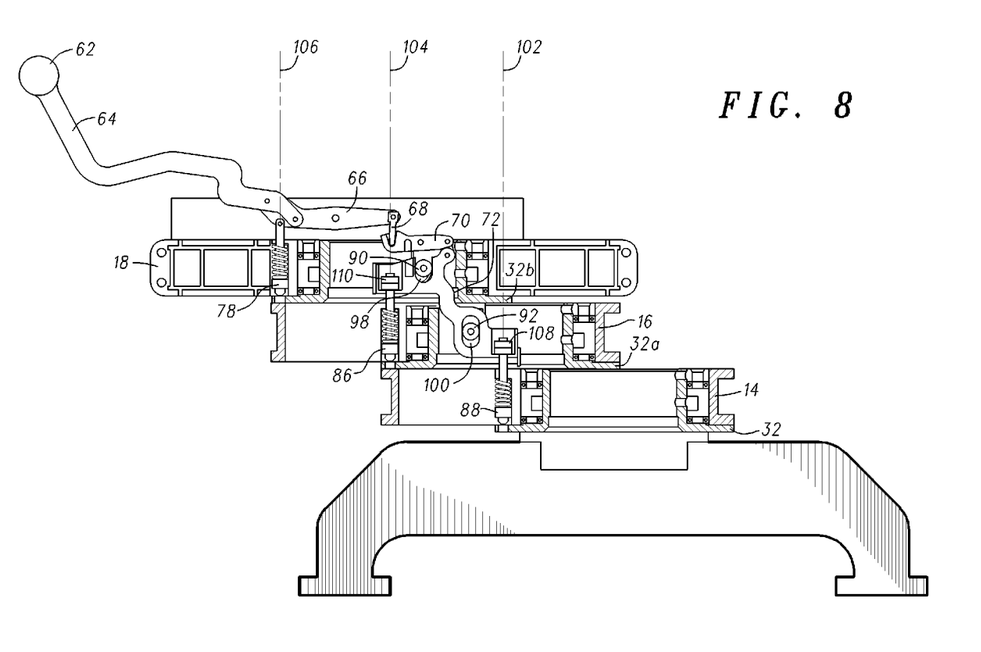
FIG. 8 is a cross-sectional view of the illustrative seat support with the seat rotation and link rotation locks disengaged and the seat platform moved to its forwardmost extended position.
Figure 9:
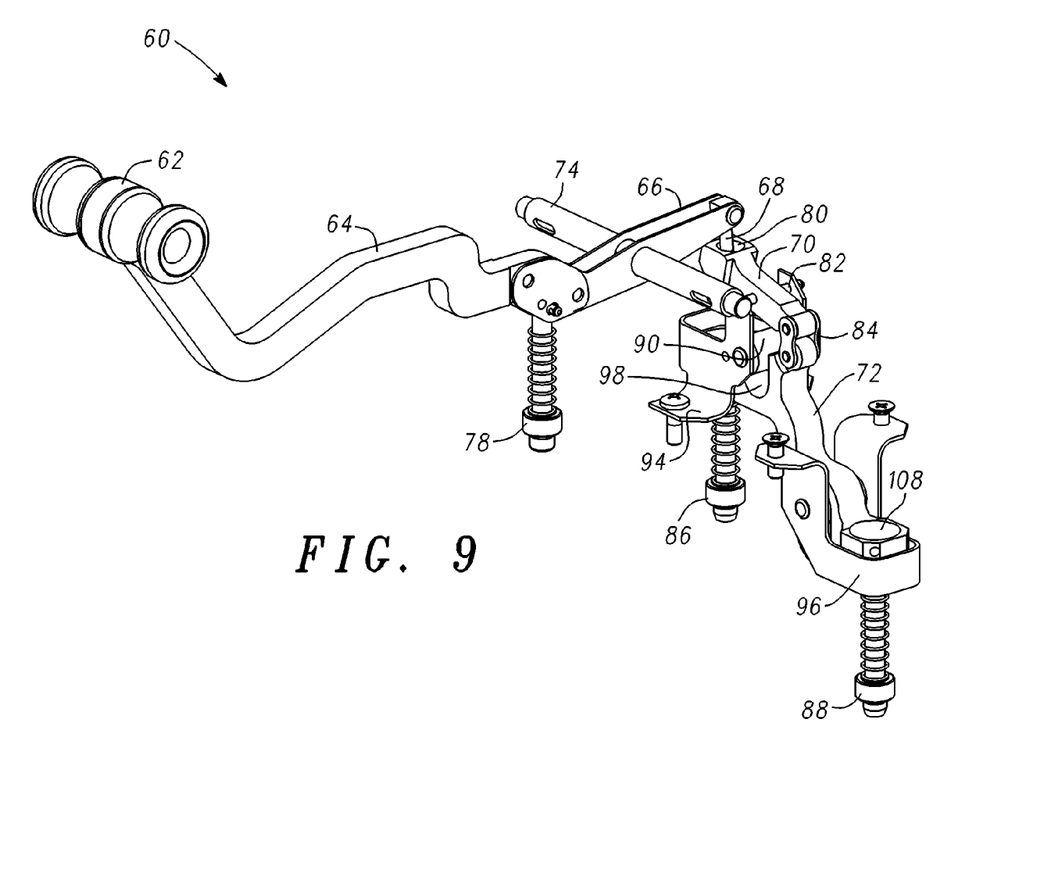
FIG. 9 is a perspective view of the rotation lock actuator linkage.

In the illustrative embodiment, lower locking pin 88 has a head portion 108 that rotates in a seat (not shown) in yoke 72 to enable yoke 72, which is mounted to intermediate link 16 to freely rotate about engaged lower locking pin 88. Alternatively, since lower locking pin is cylindrical in shape, it would be possible simply to allow lower locking pin 88 to rotate in hole 30 formed in metering plate 32. Similarly, intermediate locking pin 86 has a head portion 110 that rotates in a seat formed in yoke 72 to enable seat platform 18 to rotate about engaged intermediate locking pin 86. Because the illustrative seat support 10 has only two main links in addition to the seat platform, the longitudinal axis 106 of seat locking pin 78 is merely offset from axis 104 of upper thrust collar assembly 52, there being no additional thrust collar assemblies mounted above.

As can be determined from the foregoing, the unique arrangement of links and the alignment of the locking pins with the axis of rotation of the thrust collar assemblies immediately above enables a common rigid linkage such as yoke 72 to positively disengage and engage the locking pins without impeding free rotation of lower link 14, intermediate link 16 and seat platform 18 and without the use of flexible joints, cables or other cumbersome mechanisms.

Although certain illustrative embodiments and methods have been disclosed herein, it will be apparent from the foregoing disclosure to those skilled in the art that variations and modifications of such embodiments and methods may be made without departing from the spirit and scope of the invention. For example, although in the illustrative embodiment the support is for securing a seat to an aircraft floor, the invention is equally capable of securing other interior equipment, such as a coffee table, to a vehicle frame. Additionally, although the illustrative embodiment has only two main links, a seat supported by three or more links is considered within the scope of the invention. Accordingly, it is intended that the invention shall be limited only to the extent required by the appended claims and the rules and principles of applicable law.

What is claimed is:

1. A support for securing aircraft interior equipment to a frame comprising:

a base adapted to be attached to said frame;

a lower link having a fixed end and a free end, said fixed end of said lower link comprising a first rotating joint defining a first axis of rotation about a point fixed on said base, said free end of said lower link extending radially outward from said first axis of rotation;

an intermediate link having a fixed end and a free end, said fixed end of said intermediate link comprising a second rotating joint defining a second axis of rotation about a point fixed on said free end of lower link, said free end of said intermediate link extending radially outward from said second axis of rotation;

an equipment platform attached to said interior equipment, said equipment platform having a third rotating joint defining a third axis of rotation about a point fixed on said free end of said intermediate link;

a first rotation lock coupled to said lower link, said first rotation lock being moveable from a disengaged position to an engaged position for engaging said base to prevent rotation of said lower link about said base, said first rotation lock engaging said base at a contact point located substantially on said second axis of rotation;

a second rotation lock coupled to said intermediate link, said second rotation lock being moveable from a disengaged position to an engaged position for engaging said lower link to prevent rotation of said intermediate link about said lower link, said second rotation lock engaging said lower link at a contact point located substantially on said third axis of rotation; and an actuator moveable from a first position to a second position, said actuator coupled to said first rotation lock and said second rotation lock for moving said first rotation lock and said second rotation lock from their engaged positions into their disengaged positions.

2. The support of claim 1, wherein:
said second axis of rotation is parallel to said first axis of rotation.

3. The support of claim 2, wherein:
said third axis of rotation is parallel to said second axis of rotation.

4. The support of claim 1, wherein:
said actuator moves said first rotation lock and said second rotation lock simultaneously from their engaged positions into their disengaged positions as said actuator is moved from the first position to the second position.

5. The support of claim 1, further comprising:
a third rotation lock coupled to said equipment platform, said third rotation lock being moveable from a disengaged position to an engaged position for engaging said intermediate to prevent rotation of said equipment platform about said intermediate link.

6. The support of claim 5, wherein:
said third rotation lock engages said intermediate link at a contact point offset from said third axis of rotation.

7. The support of claim 5, wherein:
said actuator is coupled to said third rotation lock and is moveable to an intermediate position for moving said third rotation lock from the engaged position to the disengaged position.

8. The support of claim 7, wherein:
said actuator moves said first rotation lock and said second rotation lock simultaneously from their engaged positions into their disengaged positions as said actuator is moved from the intermediate position to the second position.

9. The support of claim 1, wherein:
said first rotation lock comprises a spring-loaded pin for engaging a plurality of holes formed in said base, said spring-loaded pin having a longitudinal axis coinciding with said second rotational axis; and
said second rotational lock comprises a spring-loaded pin for engaging a plurality of holes formed in said lower link, said spring-loaded pin having a longitudinal axis coinciding with said third rotational axis.

10. The support of claim 1, further comprising:
an aircraft seat attached to said equipment platform.

11. The support of claim 1, further comprising:
a table attached to said equipment platform.

12. A support for securing aircraft equipment to an aircraft frame comprising:

a base adapted to be attached to said aircraft frame;

a lower link, said lower link comprising an elongate member having a first end and a second end;

a first rotational bearing operatively disposed between the first end of said lower link and said base said first rotational bearing defining a first rotational axis;

an intermediate link, said intermediate link comprising an elongate member having a first end and a second end;

a second rotational bearing operatively disposed between the first end of said intermediate link and the second end of said lower link, said second rotational bearing defining a second rotational axis parallel to and offset from said first rotational axis;

an equipment platform adapted to be attached to said aircraft equipment;

a third rotational bearing operatively disposed between said equipment platform and the second end of said intermediate link, said third rotational bearing defining a third rotational axis parallel to and offset from said second rotational axis;

first locking means, said first locking means moveable from an unlocked position to a locked position for preventing rotation of said first rotational bearing; and second locking means, said second locking means moveable from an unlocked position to a locked position for preventing rotation of said second rotational bearing, said first and second locking means being moveable simultaneously from a locked position to an unlocked position by a shared linkage.

13. The support of claim 12, further comprising:
third locking means, said third locking means moveable from an unlocked position to a locked position for preventing rotation of said third rotational bearing, said third locking means being moveable from a locked position to an unlocked position by said shared linkage.

14. The support of claim 13, wherein:
said shared linkage comprises a moveable control arm slidably attached to said intermediate link.

15. The support of claim 14, wherein:
said shared linkage is moveable from a first position in which said first, second, and third locking means are in their locked positions respectively, to a second position in which said first and second locking means are in their locked positions and said third locking means is in its unlocked position, said shared linkage further moveable to a third position in which said first, second and third locking means are in their unlocked positions.

16. The support of claim 15, further comprising:
an operating lever pivotally attached to said equipment platform, said operating lever operatively attached to said third rotational lock and further comprising a push rod for moving said moveable control arm, said push rod having a line of action coinciding with said third rotational axis.

17. The support of claim 13, wherein:
said first rotation lock comprises a spring-loaded pin for engaging a plurality of holes formed in said base, said spring-loaded pin having a longitudinal axis coinciding with said second rotational axis; and
said second rotational lock comprises a spring-loaded pin for engaging a plurality of holes formed in said lower link, said spring-loaded pin having a longitudinal axis coinciding with said third rotational axis.

18. The support of claim 17, wherein:
said third rotation lock comprises a spring-loaded pin for engaging a plurality of holes formed in said intermediate link, said spring-loaded pin having a longitudinal axis offset from said third rotational axis.

19. The support of claim 12, further comprising:
a seat attached to said equipment platform.

20. The support of claim 12, further comprising:
a table attached to said equipment platform.

* * * * *